(12) United States Patent
Jiang et al.

(10) Patent No.: US 10,678,247 B2
(45) Date of Patent: Jun. 9, 2020

(54) METHOD AND APPARATUS FOR MONITORING OF AN AUTONOMOUS VEHICLE

(71) Applicant: GM GLOBAL TECHNOLOGY OPERATIONS LLC, Detroit, MI (US)

(72) Inventors: Shengbing Jiang, Rochester Hills, MI (US); Mutasim A. Salman, Madison, WI (US); Yilu Zhang, Northville, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 15/688,451

(22) Filed: Aug. 28, 2017

(65) Prior Publication Data

US 2019/0064823 A1 Feb. 28, 2019

(51) Int. Cl.
*G05D 1/02* (2020.01)
*B60W 30/18* (2012.01)
*G05D 1/00* (2006.01)
*B60W 10/20* (2006.01)
*B60W 10/04* (2006.01)
*B60W 10/18* (2012.01)
(Continued)

(52) U.S. Cl.
CPC .......... *G05D 1/0212* (2013.01); *B60W 10/04* (2013.01); *B60W 10/18* (2013.01); *B60W 10/20* (2013.01); *B60W 30/12* (2013.01); *B60W 30/143* (2013.01); *B60W 30/18109* (2013.01); *G05D 1/0066* (2013.01); *G05D 1/0088* (2013.01); *G05D 1/028* (2013.01); *G05D 1/0278* (2013.01); *G05D 2201/0213* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 6,792,363 B1 * | 9/2004 | Bye | ...................... | G05D 1/0005 701/2 |
| 6,804,587 B1 * | 10/2004 | O Connor | ............. | E02F 9/2045 342/357.31 |
| 10,067,502 B1 * | 9/2018 | Delp | .................... | G07C 5/0808 |

(Continued)

*Primary Examiner* — Tyler D Paige
(74) *Attorney, Agent, or Firm* — Quinn IP Law

(57) ABSTRACT

An autonomic vehicle control system includes a perception module of a spatial monitoring system that is disposed to monitor a spatial environment proximal to the autonomous vehicle. A method for evaluating vehicle dynamics operation includes determining a desired trajectory for the autonomous vehicle, wherein the desired trajectory includes desired vehicle positions including an x-position, a y-position and a heading. Vehicle control commands are determined based upon the desired trajectory, and include a commanded steering angle, an acceleration command and a braking command. Actual vehicle states responsive to the vehicle control commands are determined. An estimated trajectory is determined based upon the actual vehicle states, and a trajectory error is determined based upon a difference between the desired trajectory and the estimated trajectory. The trajectory error is monitored over a time horizon, and a first state of health (SOH) is determined based upon the trajectory error over the time horizon.

10 Claims, 3 Drawing Sheets

(51) Int. Cl.
*B60W 30/12* (2020.01)
*B60W 30/14* (2006.01)

(56) References Cited

U.S. PATENT DOCUMENTS

| | | | |
|---|---|---|---|
| 2004/0122569 A1* | 6/2004 | Bidaud | B61K 9/08 |
| | | | 701/19 |
| 2010/0082195 A1* | 4/2010 | Lee | B62D 15/025 |
| | | | 701/25 |
| 2015/0331422 A1* | 11/2015 | Hartung | G05D 1/021 |
| | | | 701/23 |
| 2017/0023945 A1* | 1/2017 | Cavalcanti | G08G 1/0116 |
| 2018/0336297 A1* | 11/2018 | Sun | G01M 17/00 |
| 2019/0064823 A1* | 2/2019 | Jiang | B60W 10/04 |

* cited by examiner

METHOD AND APPARATUS FOR MONITORING OF AN AUTONOMOUS VEHICLE

INTRODUCTION

Autonomous vehicles can include on-board monitoring systems to detect occurrence of a fault or another indication of a need for service and/or vehicle maintenance.

SUMMARY

An autonomic vehicle control system is described, and includes a perception module of a spatial monitoring system that is disposed to monitor a spatial environment proximal to the autonomous vehicle. A controller is in communication with the spatial monitoring subsystem, and the controller includes a processor and a memory device including an instruction set. A method for evaluating a vehicle dynamics operation is described, and includes determining a desired trajectory for the autonomous vehicle, wherein the desired trajectory includes desired vehicle positions including an x-position, a y-position and a heading. Vehicle control commands are determined based upon the desired trajectory, and include a commanded steering angle, an acceleration command and a braking command. Actual vehicle states responsive to the vehicle control commands are determined, wherein the actual vehicle states include a yaw rate, a lateral acceleration and a longitudinal acceleration. An estimated trajectory is determined based upon the actual vehicle states, and a trajectory error is determined based upon a difference between the desired trajectory and the estimated trajectory. The trajectory error is monitored over a time horizon, and a first state of health (SOH) is determined based upon the trajectory error over the time horizon.

An aspect of the disclosure includes determining vehicle positions based upon the vehicle control commands, wherein the predicted vehicle positions include a predicted lateral position or x-position, a predicted longitudinal position or y-position, and a predicted angular heading. An error between the desired heading and the predicted heading is dynamically determined over the time horizon. A second SOH is determined based upon the error between the desired heading and the predicted heading over the time horizon.

Another aspect of the disclosure includes dynamically monitoring the actual vehicle states including the lateral acceleration and the longitudinal acceleration over the time horizon, and determining a maximum rate of change in the lateral acceleration and the longitudinal acceleration over the time horizon. A third SOH is determined based upon the maximum rate of change in the lateral acceleration and the longitudinal acceleration over the time horizon.

Another aspect of the disclosure includes detecting a fault associated with the vehicle dynamics operation based upon the first, second and third SOHs.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
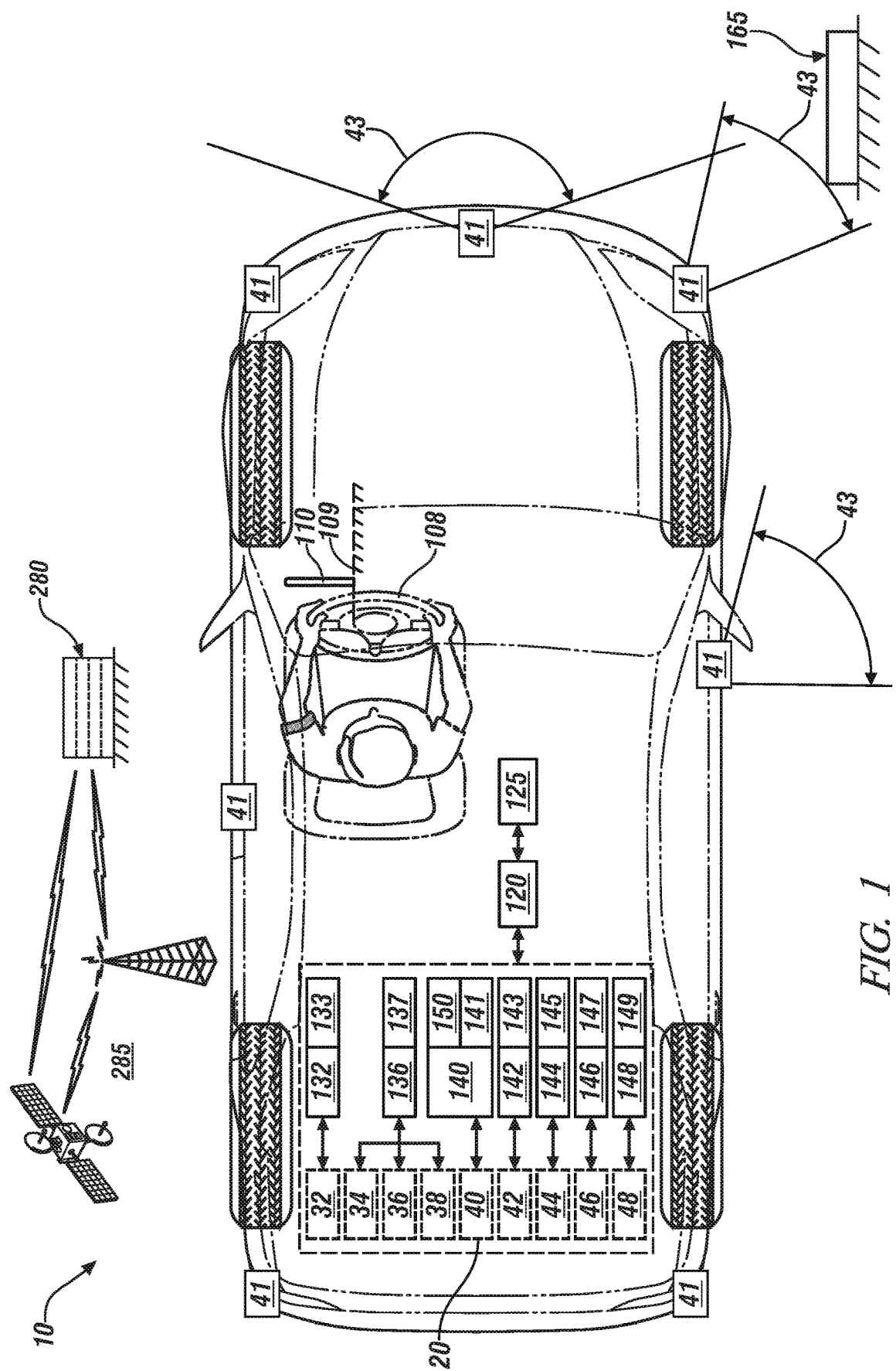
FIG. 1 schematically shows a vehicle including an autonomic vehicle control system and associated controllers, in accordance with the disclosure.

Referring to the drawings, wherein like reference numerals correspond to like or similar components throughout the several Figures, FIG. 1, consistent with embodiments disclosed herein, illustrates a vehicle 10 that includes an autonomic vehicle control system 20 and an associated vehicle health monitoring (VHM) controller 120 that is illustrative of the concepts described herein. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

As employed herein, the autonomic vehicle control system 20 includes an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of the vehicle driving functions, including steering, acceleration, and braking, wherein the driver cedes control of the vehicle for a period of time during a trip. Driving automation can include simultaneous automatic control of the vehicle driving functions, including steering, acceleration, and braking, wherein the driver cedes control of the vehicle for an entire trip. Driving automation includes hardware and controllers configured to monitor the spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The autonomic vehicle control system 20 preferably includes one or a plurality of vehicle systems and associated controllers that provide a level of driving automation, and the VHM controller 120 is disposed to monitor, prognosticate and/or diagnose operation of the autonomic vehicle control system 20. The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132; a steering system 34, a braking system 36 and a chassis system 38, which are controlled by a vehicle controller (VCM) 136; a vehicle spatial monitoring system 40 and spatial monitoring controller 140, a human-machine interface (HMI) system 42 and HMI controller 142; an HVAC system 44 and associated HVAC controller 144; operator controls 46 and an associated operator controller 146; and a vehicle lighting, illumination and external signaling system 48 and associated lighting controller 148.

Each of the vehicle systems and associated controllers may further include one or more subsystems and an associated controller. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems. Each of the aforementioned controllers includes a VHM agent, which can be implemented and executed as algorithmic code, calibrations, hardware, application-specific integrated circuitry (ASIC), or other elements. Each of the VHM agents is configured to perform component and sub-system monitoring, feature extraction, data filtering and data recording for the associated controller. The data recording can include periodic and/or event-based data recording, single time-point data recording and/or consecutive time-point data recording for certain time duration, such as before and/or after the trigger of an event. Such data recording can be accomplished employing circular memory buffers or another suitable memory device.

The PCM 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32, none of which are shown. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs. The PCM 132 also includes a PCM VHM agent 133.

The VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators. The VCM 136 also includes a VCM VHM agent 137.

The steering system 34 is configured to control vehicle lateral motion. The steering system 34 can include an electrical power steering system (EPS) coupled with an active front steering system to augment or supplant operator input through a steering wheel 108 by controlling steering angle of the steerable wheels of the vehicle 10 during execution of an autonomic maneuver such as a lane change maneuver. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The vehicle spatial monitoring system 40 and spatial monitoring controller 140 can include a controller and a plurality of spatial sensors 41, wherein each of the spatial sensors 41 is disposed on-vehicle to monitor a field of view 43 of objects and geographic regions 165 that are proximal to the vehicle 10. The spatial monitoring controller 140 generates digital representations of each of the fields of view including proximate remote objects based upon data inputs from the spatial sensors. The spatial monitoring controller 140 also includes a spatial monitoring VHM agent 141. The spatial monitoring controller 140 can evaluate inputs from the spatial sensors 41 to determine a linear range, relative speed, and trajectory of the vehicle 10 in view of each proximate remote object. The spatial sensors 41 can be located at various locations on the vehicle 10, including the front corners, rear corners, rear sides and mid-sides. The spatial sensors 41 can include a front radar sensor and a camera in one embodiment, although the disclosure is not so limited. Placement of the aforementioned spatial sensors 41 permits the spatial monitoring controller 140 to monitor traffic flow including proximate vehicles and other objects around the vehicle 10. Data generated by the spatial monitoring controller 140 may be employed by a lane mark detection processor (not shown) to estimate the roadway. The spatial sensors 41 of the vehicle spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s). Such sensing systems are employed for detecting and locating objects in automotive applications and are useable with systems including, e.g., adaptive cruise control, autonomous braking, autonomous steering and side-object detection.

The spatial sensors 41 associated with the vehicle spatial monitoring system 40 are preferably positioned within the vehicle 10 in relatively unobstructed positions to monitor the spatial environment. As employed herein, the spatial environment includes all external elements, including fixed objects such as signs, poles, trees, houses, stores, bridges, etc.; and, moving or moveable objects such as pedestrians and other vehicles. Each of these spatial sensors 41 provides an estimate of actual location or condition of an object, wherein said estimate includes an estimated position and standard deviation. As such, sensory detection and measurement of object locations and conditions are typically referred to as 'estimates.' It is further appreciated that the characteristics of these spatial sensors 41 are complementary, in that some are more reliable in estimating certain parameters than others. The spatial sensors 41 can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some of the spatial sensors 41 present parametric variances during operation, although overlapping coverage areas of the sensors create opportunities for sensor data fusion.

The HVAC system 44 is disposed to manage the ambient environment of the passenger compartment, including, e.g., temperature, humidity, air quality and the like, in response to operator commands that are communicated to the HVAC controller 144, which controls operation thereof. The HVAC controller 144 also includes an HVAC VHM agent 145.

The operator controls 46 can be included in the passenger compartment of the vehicle 10 and may include, by way of non-limiting examples, a steering wheel 108, an accelerator pedal, a brake pedal and an operator input device 110. The operator controls 46 and associated operator controller 146 enable a vehicle operator to interact with and direct operation of the vehicle 10 in functioning to provide passenger transportation. The operator controller 146 also includes an operator controller VHM agent 147. The operator control devices including the steering wheel 108, accelerator pedal, brake pedal, transmission range selector and the like may be omitted in some embodiments of the autonomous vehicle 10.

The steering wheel 108 can be mounted on a steering column 109 with the input device 110 mechanically mounted on the steering column 109 and configured to communicate with the operator controller 146. Alternatively, the input device 110 can be mechanically mounted proximate to the steering column 109 in a location that is convenient to the vehicle operator. The input device 110, shown herein as a stalk projecting from column 109, can include an interface device by which the vehicle operator may command vehicle operation in one or more autonomic control modes, e.g., by commanding activation of element(s) of the autonomous vehicle control system 20. The mechanization of the input device 110 is illustrative. The input device 110 may be mechanized in one or more of a plurality of devices, or may be in the form of a controller that is voice-activated, or may be another suitable system. The input device 110 preferably has control features and a location that is used by present turn-signal activation systems. Alternatively, other input devices, such as levers, switches, buttons, and voice recognition input devices can be used in place of or in addition to the input device 110.

The HMI system 42 provides for human/machine interaction, for purposes of directing operation of an infotainment system, an on-board GPS tracking device, a navigation system and the like, and includes an HMI controller 142. The HMI controller 142 monitors operator requests and provides information to the operator including status of vehicle systems, service and maintenance information. The HMI controller 142 can also include a global positioning/navigation system. The HMI controller 142 communicates with and/or controls operation of a plurality of operator interface devices, wherein the operator interface devices are capable of transmitting a message associated with operation of one of the autonomic vehicle control systems. The HMI controller 142 may also communicate with one or more devices that monitor biometric data associated with the vehicle operator, including, e.g., eye gaze location, posture, and head position tracking, among others. The HMI controller 142 is depicted as a unitary device for ease of description, but may be configured as a plurality of controllers and associated sensing devices in an embodiment of the system described herein. The HMI controller 142 also includes an HMI VHM agent 143. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI controller 142. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like. HUD and related systems are understood by those skilled in the art.

The vehicle lighting, illumination and external signaling system 48 includes a plurality of headlamps, tail lamps, brake lamps, marker lamps, signal lamps, and the like, which are controllable via the lighting controller 148. The lighting controller 148 is in communication with ambient light sensors, the GPS tracking device, and the navigation system, and executes control routines that selectively illuminate various ones of the headlamps, tail lamps, brake lamps, marker lamps, signal lamps based upon the ambient light, the direction of intended travel from the GPS tracking device and navigation systems, and other factors. Other factors may include an override command to illuminate the vehicle lamps in a construction zone. The lighting controller 148 also includes a lighting VHM agent 149.

In one embodiment, the vehicle 10 is configured to communicate with a communication network 285, including communicating between a controller associated with an intelligent highway system and the vehicle 10. An intelligent highway system can be configured to monitor locations, speeds and trajectories of a plurality of vehicles, with such information employed to facilitate control of one or a plurality of similarly-situated vehicles. This can include communicating geographic location, forward velocity and acceleration rate of one or more vehicles in relation to the vehicle 10. In one embodiment, the vehicle 10 is configured to communicate with an off-board controller 280 via the communication network 285.

The VHM controller 120 is configured to autonomously monitor health of various on-board subsystems that perform one or more functions related to autonomous vehicle operation. The VHM controller 120 includes a controller architecture that is configured with multilayer hierarchical VHM data processing, collection, and storage employing the plurality of VHM agents that are associated with a VHM master controller that can communicate with the off-board controller 280. This configuration can serve to reduce data processing complexity, data collection and data storage costs. The VHM controller 120 provides a centralized system monitoring and a distributed system monitoring arrangement with data collection via the VHM master controller and the plurality of VHM agents to provide a rapid response time and an integrated vehicle/system level coverage. The VHM controller 120 can also include a fault mitigation controller and a redundant VHM master controller to verify integrity of VHM information employed by the fault mitigation controller.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms "prognosis", "prognostics", and related terms are associated with data monitoring and algorithms and evaluations that render an advance indication of a likely future event associated with a component, a subsystem, or a system. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a fault in the operation of the component, subsystem, or system ("Red" or "R"). The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routine that operate to lessen the effect of a fault in a component, subsystem or system.

The telematics controller 125 includes a wireless telematics communication system capable of extra-vehicle communications, including communicating with the communication network system 285 having wireless and wired communication capabilities. The telematics controller 125 is capable of extra-vehicle communications that includes short-range vehicle-to-vehicle (V2V) communication. Alternatively or in addition, the telematics controller 125 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with the off-board controller 280 via the communication network 285. Alternatively or in addition, the telematics controller executes the extra-vehicle communication directly by communicating with the off-board controller 280 via the communication network 285.

Prognostic classification routines to determine a prognostic, i.e., R/Y/G, for each of the subsystems can be executed in the VHM controller 120. The prognostic classification routines can detect occurrence of a Green prognostic associated with one of the vehicle subsystems and associated controllers of the autonomic vehicle control system 20, and the VHM controller 120 can block associated data transmission off board via the communication network 285 to reduce data communication load to the off-board controller 280. Alternatively, the transmission of a Green prognostic can be in the form of a simple acknowledgement of Green determination for a component, subsystem, or system of one of the vehicle systems and associated controllers of the autonomic vehicle control system 20 with a time stamp, thus minimizing the data transmission load to the off-board controller 280.

The VHM controller 120 includes executable routines that evaluate on-vehicle devices that monitor the spatial environment proximal the autonomous vehicle 10, including, e.g., the spatial sensors 41, the vehicle spatial monitoring system 40, spatial monitoring controller 140 and spatial monitoring VHM agent 141 that are described with reference to FIG. 1.

The spatial monitoring controller 140 includes a perception module 150 that is configured to monitor vehicle position, vehicle dynamic states and the spatial environment proximal to the autonomous vehicle 10. The perception module 150 is disposed on-vehicle to monitor and characterize the spatial environment proximal to the vehicle 10, which is provided to the vehicle systems and associated controllers of the autonomic vehicle control system 20 to provide a level of driving automation. Data and signal inputs to the perception module 150 include spatial environment data in the form of inputs from the spatial sensors 41, which include cameras, radars, lidars, etc. Data inputs to the perception module 150 further include map data in the form of a detailed 3D map of the surrounding environment and position data from the GPS tracking device. Data inputs to the perception module 150 further includes vehicle dynamic data in the form of data collected from in-vehicle sensors such as gyros and wheel speed sensors. Data inputs to the perception module 150 further includes information communicated from other vehicles, e.g., V2V data, and information communicated from the infrastructure, e.g., V2X data.

The perception module 150 includes localization, object detection, and classification algorithms to estimate the position of the current road, the current traffic lane, the types and position of objects and obstacles, including both static and dynamic obstacles and objects. The perception module 150 can estimate motion and behavior of the surrounding moving obstacles on the road and on the traffic lane. The perception module 150 also monitors and estimates vehicle position and dynamic states, as described herein. The vehicle position states include geographically defined x- and y-states (e.g., latitude and longitude), and an angular heading. The vehicle dynamic states include yaw, lateral acceleration and longitudinal acceleration states.

Figure 2:
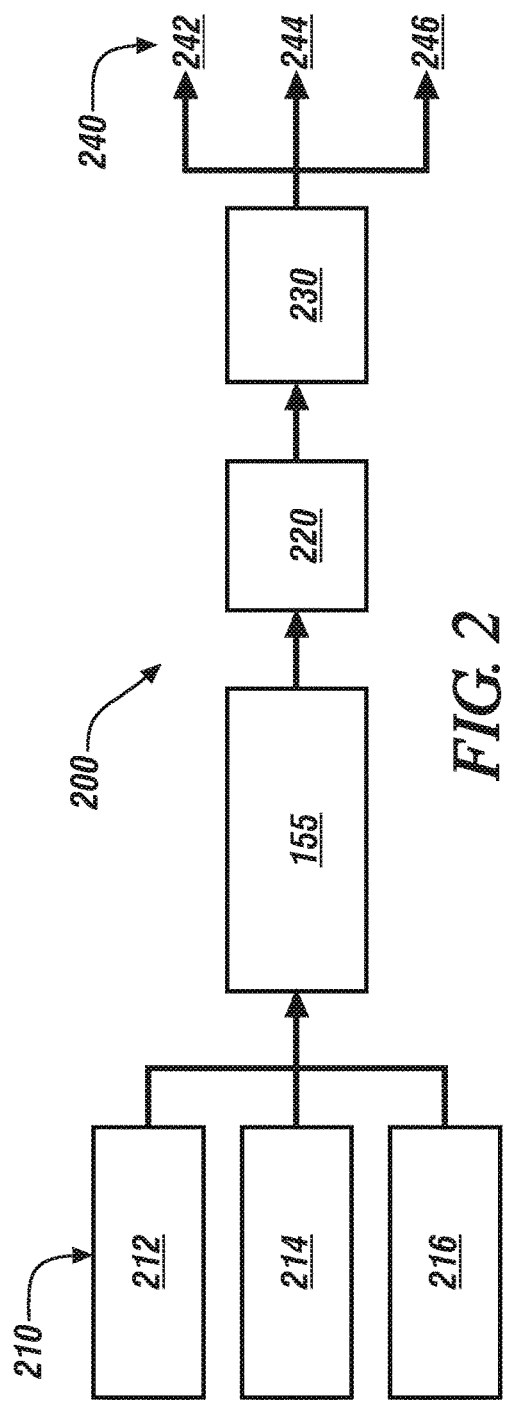
FIG. 2 schematically shows an information flow diagram associated with an autonomous driving function for controlling a trajectory of the autonomous vehicle that is described with reference to FIG. 1, in accordance with the disclosure.

FIG. 2 schematically shows an information flow diagram 200 associated with an autonomous driving function for controlling a trajectory of the autonomous vehicle 10 that is described with reference to FIG. 1. The information flow diagram 200 includes data and signal inputs 210 that are supplied to the perception module 150, which generates an output 155 that can be employed in a trajectory planning routine 220. The trajectory planning routine 220 generates a desired trajectory 225 that is supplied to vehicle controllers that generate actuator commands 240 based thereon.

The data and signal inputs 210 to the perception module 150 include spatial environment data in the form of inputs from the spatial sensors 41, which include cameras, radars, lidars, etc. (216). Data inputs to the perception module 150 further include map data in the form of a detailed 3D map of the surrounding environment and position data from the GPS tracking device (214). Data inputs to the perception module 150 further include vehicle dynamic data in the form of data collected from in-vehicle sensors such as gyros and wheel speed sensors (212). Data inputs to the perception module 150 may also include information communicated from other vehicles, e.g., V2V data, and information communicated from the infrastructure, e.g., V2X data.

The perception module 150 generates output 155 based upon the data and signal inputs 210, wherein the output 155 includes estimates of the position of the current road, the current traffic lane, the types and position of objects and obstacles, including both static and dynamic obstacles and objects, estimates of motion and behavior of the surrounding moving obstacles on the road and on the traffic lane, and estimates of the position and dynamic states of the vehicle 10.

The trajectory planning routine 220 generates the desired trajectory 225 for the vehicle 10 based upon the output 155 from the perception module 150, taking into account a planned travel path for the vehicle 10. The desired trajectory 225 represents a feasible travel path over a time horizon that can be accomplished while avoiding static and dynamic obstacles and objects and also avoiding passenger discomfort. The desired trajectory 225 includes desired vehicle states of x and y coordinates and a heading angle for the vehicle 10, and is determined for the time horizon, which can be several seconds in one embodiment. A behavior control routine 230 determines actuator commands 240 in the form of a steering angle command 242, a vehicle braking command 244 and a vehicle acceleration command 246 to achieve the desired trajectory 225. The vehicle controllers, e.g., the PCM 132 and the VCM 136, implement the respective actuator commands 240. The steering angle command 242 can be implemented via the steering system 34, the vehicle braking command 244 can be implemented via the braking system 36, and the vehicle acceleration command 246 can be implemented via the drivetrain 32.

Vehicle motion can be described employing non-linear dynamic equations, including as follows:

$$X1_{k+1} = f_k(X1_k, u_k) \quad [1]$$

wherein:
$x1_k$ includes vehicle states of yaw rate, lateral speed and longitudinal speed at time k, and
$u_k$ represents vehicle control inputs of steering, braking and acceleration at time k.

Vehicle kinematics can be represented as follows:

$$x2_{k+1} = g_k(x1_k) \quad [2]$$

wherein:
$x2_k$ represents a global position of the vehicle at time k, in terms of Xg and Yg coordinates, vehicle speed v, and a heading angle phi.

Vehicle measurements include vehicle speed (v), a yaw rate (r), a lateral acceleration (ay), and a longitudinal acceleration (ax).

The global position of the vehicle, in terms of Xg and Yg coordinates and vehicle heading angle, in terms of phi, can be determined employing the GPS tracking device.

The measurement equation can be represented as follows:

$$y_k = h_k(x_k, u_k) \quad [3]$$

wherein $y_k$=[r(k) v(k) ay(k) ax(k) Xg(k) Yg(k), phi] when the GPS tracking device is available and $y_k$=[r(k) ay(k) ax(k)] when a GPS tracking device is not available.

The foregoing EQS. 1, 2 and 3 can be employed to evaluate vehicle dynamics operation in the autonomous vehicle described with reference to FIG. 1 and determine states of health based thereon. This includes a fusion of vehicle dynamic model and vehicle kinematics and available measurements. An estimate of the vehicle trajectory can be established and then compared with the desired vehicle trajectory while taking into account modeling and measurements uncertainties.

Overall, evaluating the vehicle dynamics operation includes determining a desired trajectory for the autonomous vehicle, wherein the desired trajectory includes desired vehicle positions including an x-position, a y-position, a longitudinal speed, and a heading, and determining vehicle control commands based upon the desired trajectory. The vehicle control commands include one or a combination of a commanded steering angle, an acceleration command and a braking command. Actual vehicle states responsive to the vehicle control commands can be determined, and include a yaw rate, a longitudinal speed, a lateral acceleration and a longitudinal acceleration. An estimated trajectory is determined based upon the actual vehicle states. A trajectory error can be determined based upon a difference between the desired trajectory and the estimated trajectory. The trajectory error can be dynamically monitored over a time horizon, and states of health can be determined based upon the dynamic monitoring. This operation is described with reference to FIGS. 3 and 4.

Figure 3:
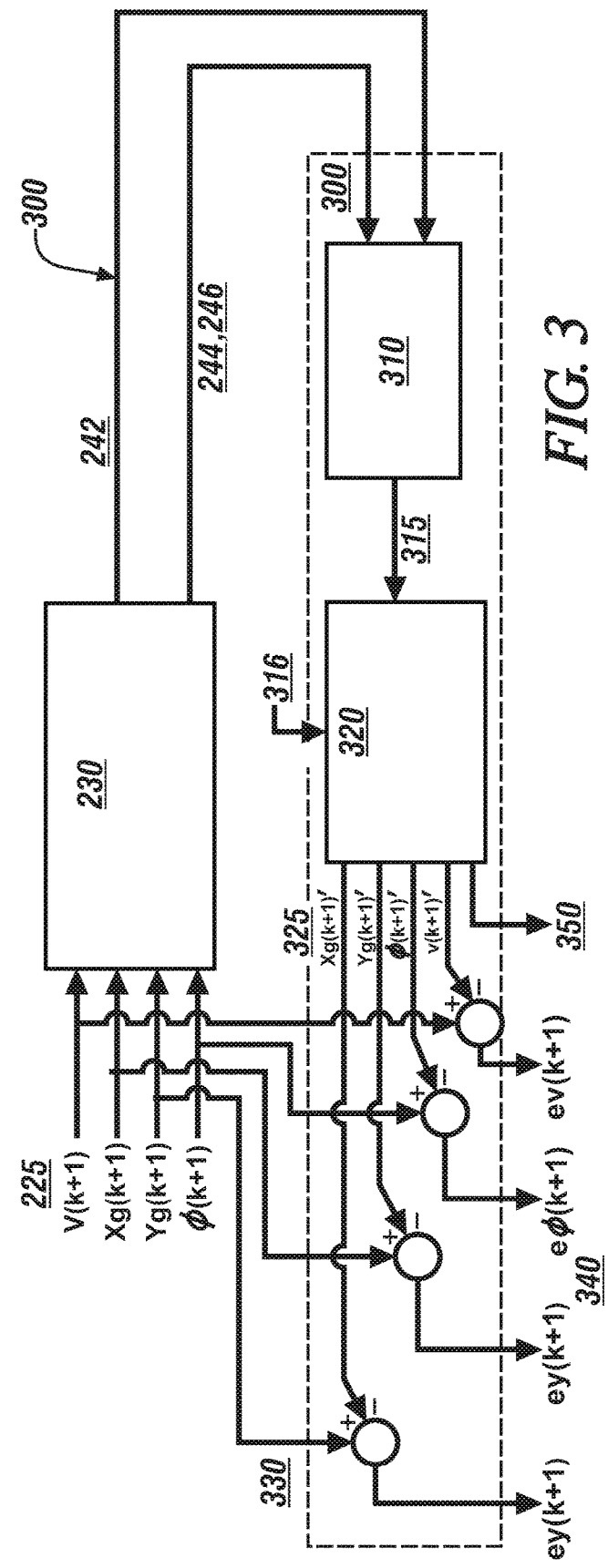
FIG. 3 is a schematic drawing that shows information flow and processing for a trajectory error determination routine that is associated with a vehicle dynamics control routine for an embodiment of the autonomous vehicle that is described with reference to FIG. 1, in accordance with the disclosure.

FIG. 3 is a schematic drawing that shows information flow and processing for a trajectory error determination routine 300 that is associated with a vehicle dynamics control routine for an embodiment of the autonomous vehicle 10. As previously described, the trajectory planning routine 220 generates the desired trajectory 225 for the vehicle 10 based upon the output 155 from the perception module 150, taking into account a planned travel path for the vehicle 10. The behavior control routine 230 determines the actuator commands 240 in the form of the steering angle command 242, the vehicle braking command 244 and the vehicle acceleration command 246, which are input to the trajectory error determination routine 300.

The actuator commands 240 in the form of the steering angle command 242, the vehicle braking command 244 and the vehicle acceleration command 246 are provided as inputs to a vehicle dynamics and kinematics routine 310. The kinematics routine 310 includes executable forms of EQS. 1, 2 and 3, from which a predicted trajectory 315 is determined. The predicted trajectory 315 is subjected to a filtering routine 320, which includes a Kalman filter that accounts for actual vehicle states 316. The filtering routine 320 generates an estimated trajectory 325, which can be expressed as follows:

Xg(k+1)', which is an estimated x-position,
Yg(k+1)', which is an estimated y-position,
$\Phi$g(k+1)', which is an estimated vehicle heading, and
Vg(k+1)', which is an estimated vehicle longitudinal speed.

The trajectory error determination routine 300 calculates differences between the corresponding elements of the desired trajectory 225 and the estimated trajectory 325 via arithmetic elements 330, and generates a trajectory error 340 that includes:

ex(k+1), which is a trajectory error associated with the x-position,
ey(k+1), which is a trajectory error associated with the y-position,
e$\Phi$(k+1) which is a trajectory error associated with the vehicle heading, and
eV(k+1) which is a trajectory error associated with the vehicle longitudinal speed.

The trajectory error can be dynamically monitored over a time horizon, and states of health can be determined based upon the dynamic monitoring. This operation is described with reference to FIG. 4.

Figure 4:
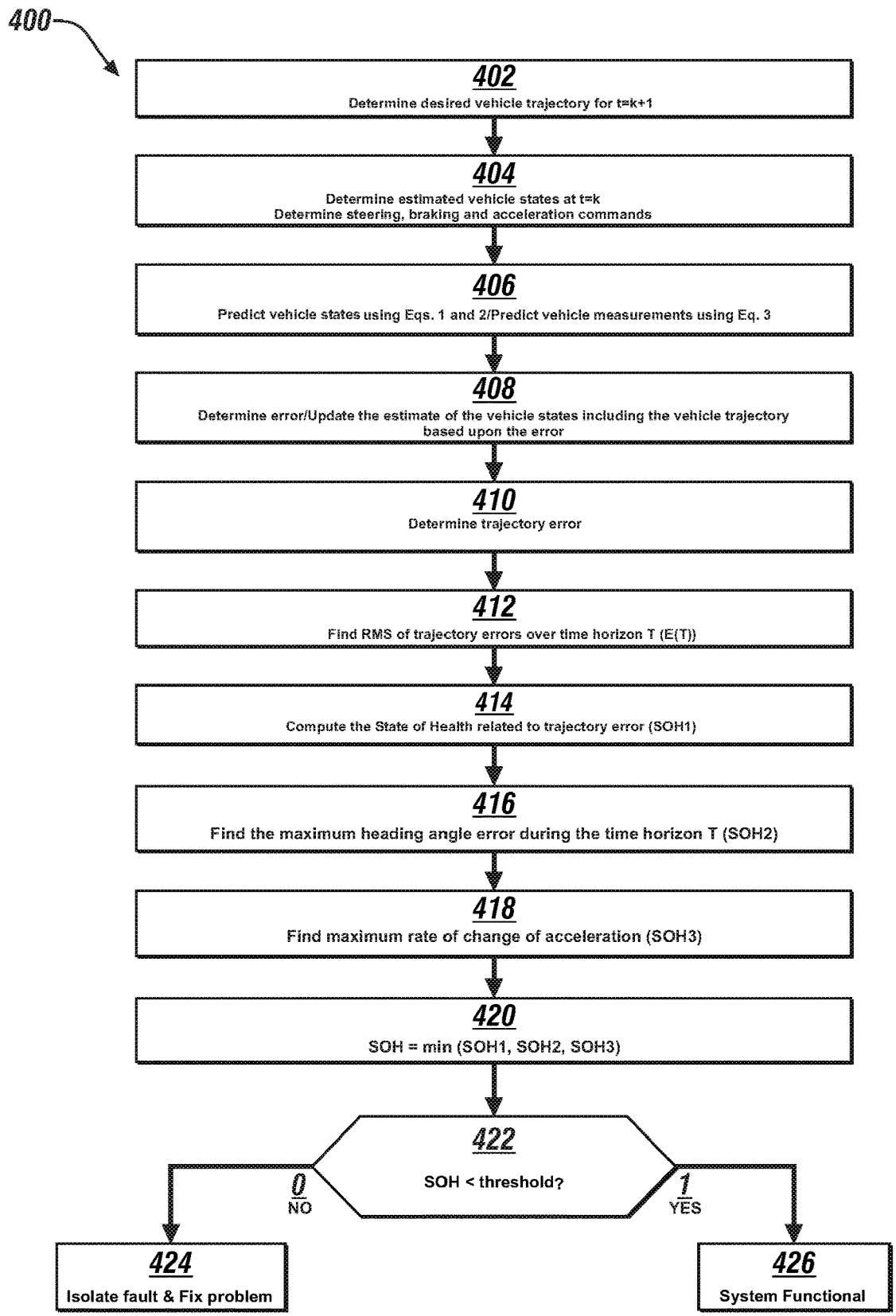
FIG. 4 schematically shows an embodiment of a routine for evaluating a state of health (SOH) for vehicle dynamics operation for an embodiment of the autonomous vehicle that is described with reference to FIG. 1, in accordance with the disclosure.

FIG. 4 schematically shows an embodiment of a routine 400 for evaluating a state of health (SOH) for vehicle dynamics operation of an autonomous vehicle, e.g., the vehicle 10, which incorporates the trajectory error determination routine 300. The routine can be executed as one or a plurality of control routines by the VHM controller 140, employing information stored therein or available from other devices either on-vehicle or off-vehicle. Table 1 is provided as a key wherein the numerically labeled blocks and the corresponding functions are set forth as follows, corresponding to the routine 400. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 402 | Determine desired vehicle trajectory for t = k + 1 |
| 404 | Determine estimated vehicle states at t = k Determine steering, braking and acceleration commands |
| 406 | Predict the vehicle states at t = k + 1 ($x_{k+1}$'|k, including vehicle trajectory) using EQS. 1 and 2 Predict vehicle measurements at t = k + 1 ($y_{k+1}$'|k) using EQ. 3 |
| 408 | Determine error between the actual measurements at t = k + 1 ($y_{k+1}$) and predicted measurements ($y_{k+1}$'|k); Update the estimate of the vehicle states including the vehicle trajectory based upon the error |
| 410 | Compute trajectory error between the desired vehicle trajectory and the estimated trajectory (ex(k + 1), ey(k + 1), eØ(k + 1), ev(k + 1)) |
| 412 | Find RMS of trajectory errors determined over time horizon T (E(T)) |
| 414 | Determine first SOH related to trajectory error: SOH1 = f1(E(T), thresh1) |
| 416 | Determine second SOH related to a maximum heading angle error over time horizon T: SOH2 = f2(EØ(T), Thresh2) |
| 418 | Determine third SOH related to a maximum rate of change in acceleration over time horizon T SOH3 = f3(Da(T), Thresh3) |
| 420 | SOH = min(SOH1, SOH2, SOH3) |
| 422 | Is SOH less than threshold SOH? Is change in SOH greater than threshold change? |
| 424 | Detect and isolate fault |
| 426 | System functioning according to specification |

Execution of the routine 400 for evaluating the state of health (SOH) for vehicle dynamics operation of an embodiment of the autonomous vehicle 10 that is described with reference to FIG. 1. The steps of the routine 400 may be executed in a suitable order, and are not limited to the order described with reference to FIG. 4.

The routine 400 includes determining a desired vehicle trajectory for t=k+1 (402) and determining estimated vehicle states at t=k and steering, braking and acceleration commands based thereon, as previously described (404). The vehicle states at t=k+1 ($x_{k+1}$'|k, including vehicle trajectory) are predicted using executable forms of EQS. 1 and 2, and vehicle measurements at t=k+1 ($y_{k+1}$'|k) are predicted using executable forms of EQ. 3 (406). Errors between the actual measurements at t=k+1($y_{k+1}$) and predicted measurements ($y_{k+1}$'|k) are determined, and the estimates of the vehicle states including the vehicle trajectory are updated based upon the error (408). Trajectory errors between the desired vehicle trajectory and the estimated trajectory (ex(k+1), ey(k+1), eØ(k+1) and ev(k+1)) are determined (410). Details related to steps 406, 408 and 410 are described with reference to FIG. 3. This portion of the routine 400 is periodically executed during vehicle operation, including periodically determining and storing values for trajectory errors between the desired vehicle trajectory and the estimated trajectory (ex(k+1), ey(k+1), eØ(k+1) and ev(k+1)). The routine 400 calculates root-mean squared (RMS) errors over a time horizon T associated with vehicle operation, i.e., E(T) (412).

A first SOH term SOH1 related to the trajectory error is determined in relation to the magnitude of E(T) relative to a first threshold Thresh1 (414). The SOH1 term decreases with an increase in the trajectory error, and increases with a decrease in the trajectory error.

A second SOH term SOH2 related to a heading angle error is determined, and includes a maximum heading angle error over the time horizon T, relative to a second threshold Thresh2 (416). The SOH2 term decreases with an increase in the maximum heading angle error, and increases with a decrease in the maximum heading angle error.

A third SOH term SOH3 related to a change in acceleration is determined, and includes a maximum rate of change of acceleration in either the lateral direction (ax) or the longitudinal direction (ay) over the time horizon T, relative to a third threshold Thresh3 (418). The SOH3 term decreases with an increase in the maximum rate of change of acceleration, and increases with a decrease in the maximum rate of change of acceleration.

The thresholds (Thresh1, Thresh2, Thresh3) as well as the SOH calculations (functions f1, f2, f3) can be adjusted based on fleet data in the same geographic locations and under the same ambient environment conditions, weather conditions like wind direction and strength, road surface conditions, and vehicle load conditions.

The overall SOH of the vehicle dynamics operation is determined as a minimum value for SOH1, SOH2 and SOH3 (420). The overall SOH is evaluated by being compared to a threshold SOH, and based upon whether a change in the overall SOH is greater than a threshold value (422). If the overall SOH is less than a threshold, or experienced a large decrease in value (422)(0), a fault is indicated, and the routine 400 reports occurrence of a fault and isolates the related information for service (424). Otherwise (422)(1), the routine 400 indicates that the system is functioning as intended (426) and this iteration ends. Reporting occurrence of a fault can include notifying the operator via the HMI devices and/or communicating the result to the off-board controller 280 via the communication network 285, wherein the off-board controller 280 is associated with a vehicle service center.

Software and hardware faults can lead to error in the computation of the steering and braking/acceleration commands. Other factors such as outside vehicle disturbances (e.g., wind, bumpy roads), changing vehicle characteristics, and incorrect vehicle parameters may lead to a vehicle trajectory that is different from the desired one. The routine 400 for evaluating the state of health (SOH) for vehicle dynamics operation of an embodiment of the autonomous vehicle 10 advantageously detects the deviation of the vehicle trajectory from the desired trajectory and provides notice to a mitigation system and/or the vehicle operator.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for evaluating vehicle dynamics operation in an autonomous vehicle, the method comprising:
   operating an autonomic vehicle control system to provide lane keeping control of the autonomous vehicle;
   determining a desired trajectory for the autonomous vehicle predictively representing a feasible travel path over a time horizon, wherein the desired trajectory includes desired vehicle positions including an x-position, a y-position and a heading;
   determining vehicle control commands associated with the vehicle dynamics operation based upon the desired trajectory, wherein the vehicle control commands include a commanded steering angle associated with a steering system, an acceleration command associated with a drivetrain, and a braking command associated with a braking system;
   determining, via an inertial sensor and a wheel speed sensor, actual vehicle states responsive to the vehicle control commands, wherein the actual vehicle states include a yaw rate, a lateral acceleration and a longitudinal acceleration;
   predictively determining an estimated trajectory over the time horizon based upon the actual vehicle states;
   determining a trajectory error based upon a difference between the desired trajectory and the estimated trajectory;
   dynamically monitoring the trajectory error over the time horizon;
   determining, via a controller, a first state-of-health (hereafter 'SOH') term, wherein the first SOH term is associated with the vehicle dynamics operation of the autonomous vehicle and is based upon the trajectory error monitored over the time horizon;
   determining predicted vehicle positions based upon the vehicle control commands, wherein the predicted vehicle positions include a predicted x-position, a predicted y-position, a predicted heading and a predicted vehicle speed;
   dynamically determining an error between the desired heading and the predicted heading over the time horizon;
   determining a second SOH term based upon the error between the desired heading and the predicted heading over the time horizon, wherein the second SOH term is associated with the vehicle dynamics operation of the autonomous vehicle;
   dynamically monitoring the actual vehicle states including the lateral acceleration and the longitudinal acceleration over the time horizon;
   determining a maximum rate of change in the lateral acceleration and the longitudinal acceleration over the time horizon;
   determining a third SOH term based upon the maximum rate of change in the lateral acceleration and the longitudinal acceleration over the time horizon, wherein the third SOH term is associated with the vehicle dynamics operation of the autonomous vehicle;
   detecting a fault associated with the vehicle dynamics operation based upon the first, second and third SOH terms; and
   communicating the fault to one of a fault mitigation controller operable to correct operation of the autonomic vehicle control system through a lane keeping operation and a human/machine interaction system operable to provide notice to an operator of the fault for human intervention through the lane keeping operation.

2. The method of claim 1, wherein the first SOH term decreases with an increase in the trajectory error and increases with a decrease in the trajectory error.

3. The method of claim 1, wherein the second SOH term decreases with an increase in the error between the desired heading and the predicted heading, and increases with a decrease in the error between the desired heading and the predicted heading.

4. The method of claim 1, wherein the third SOH term decreases with an increase in the maximum rate of change of the lateral acceleration and the longitudinal acceleration, and increases with a decrease in the maximum rate of change of the lateral acceleration and the longitudinal acceleration.

5. The method of claim 1, wherein the trajectory error includes a first trajectory error associated with the x-position, a second trajectory error associated with the y-position, a third trajectory error associated with the vehicle heading, and a fourth trajectory error associated with the vehicle longitudinal speed.

6. An autonomous vehicle, comprising:
   a steering system, a braking system, and a drivetrain;
   a plurality of spatial monitoring sensors;
   a GPS tracking device;
   vehicle dynamic sensors;
   a perception module disposed to monitor the spatial monitoring sensors, the vehicle dynamic sensors and the GPS tracking device;
   a telematics device;
   wherein the perception module includes routines for estimating a position of the current road, current traffic lane, types and position of objects and obstacles;

a vehicle control system providing lane keeping control of the autonomous vehicle; and a controller in communication with the steering system, the braking system, and the drivetrain, the perception module, the telematics device, the spatial monitoring sensors, the GPS tracking device and the vehicle dynamic sensors; the controller including an instruction set, the instruction set being executable to:

determine a desired trajectory for the autonomous vehicle predictively representing a feasible travel path over a time horizon, wherein the desired trajectory includes desired vehicle positions including an x-position, a y-position and a heading;

determine vehicle control commands for the steering system, the braking system, and the drivetrain based upon the desired trajectory, wherein the vehicle control commands include a commanded steering angle, an acceleration command and a braking command;

determine, via the vehicle dynamics sensors, actual vehicle states responsive to the vehicle control commands, wherein the actual vehicle states include a yaw rate, a lateral acceleration and a longitudinal acceleration;

predictively determine an estimated trajectory over the time horizon based upon the actual vehicle states;

determine a trajectory error based upon a difference between the desired trajectory and the estimated trajectory;

dynamically monitor the trajectory error over the time horizon;

determine a first state-of-health (hereafter 'SOH') term based upon the trajectory error monitored over the time horizon;

determine predicted vehicle positions based upon the vehicle control commands, wherein the predicted vehicle positions include a predicted x-position, a predicted y-position, a predicted heading and a predicted vehicle speed;

dynamically determine an error between the desired heading and the predicted heading over the time horizon;

determine a second SOH term based upon the error between the desired heading and the predicted heading over the time horizon, wherein the second SOH term is associated with the vehicle dynamics operation of the autonomous vehicle;

dynamically monitor the actual vehicle states including the lateral acceleration and the longitudinal acceleration over the time horizon;

determine a maximum rate of change in the lateral acceleration and the longitudinal acceleration over the time horizon;

determine a third SOH term based upon the maximum rate of change in the lateral acceleration and the longitudinal acceleration over the time horizon, wherein the third SOH term is associated with the vehicle dynamics operation of the autonomous vehicle;

detect a fault associated with the vehicle dynamics operation based upon the first, second and third SOH terms; and communicate the fault to one of an off-board controller operable to recommend subsequent service based upon the fault, a fault mitigation controller operable to correct operation of the vehicle control system, or a human/machine interaction system operable to provide notice to an operator of the fault for human intervention.

7. The autonomous vehicle of claim 6, wherein the instruction set includes the first SOH term decreasing with an increase in the trajectory error and increasing with a decrease in the trajectory error.

8. The autonomous vehicle of claim 6, wherein the second SOH term decreases with an increase in the error between the desired heading and the predicted heading, and increases with a decrease in the error between the desired heading and the predicted heading.

9. The autonomous vehicle of claim 6, wherein the third SOH term decreases with an increase in the maximum rate of change of the lateral acceleration and the longitudinal acceleration, and increases with a decrease in the maximum rate of change of the lateral acceleration and the longitudinal acceleration.

10. The autonomous vehicle of claim 6, wherein the trajectory error includes a first trajectory error associated with the x-position, a second trajectory error associated with the y-position, a third trajectory error associated with the vehicle heading, and a fourth trajectory error associated with the vehicle longitudinal speed.

* * * * *